July 2, 1940.　　　　　J. M. OLSON　　　　　2,206,329
TANK GAUGE
Filed Nov. 8, 1939　　　2 Sheets-Sheet 1
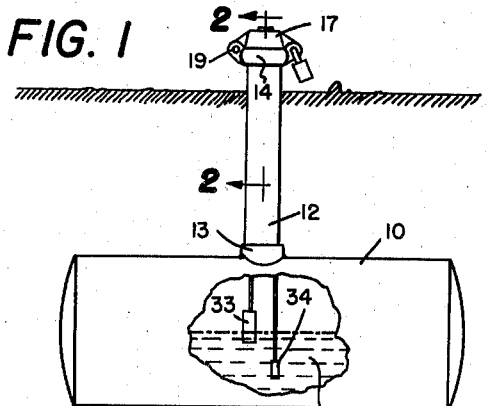
FIG. 1
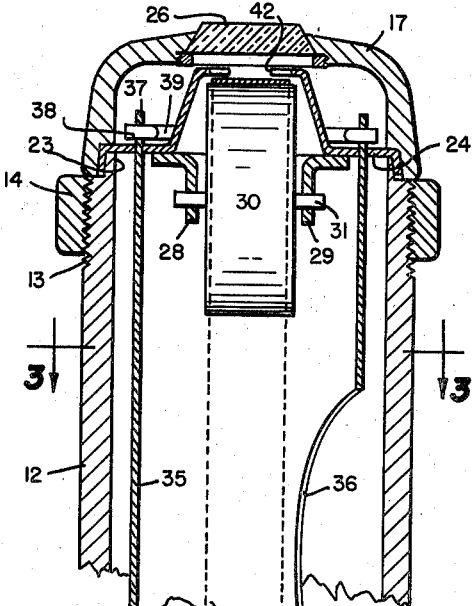
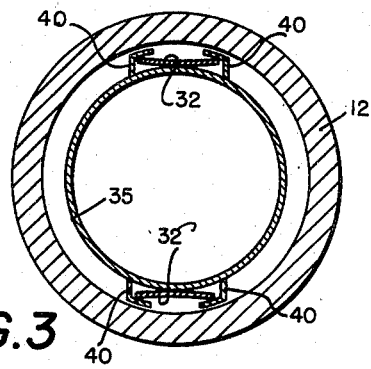
FIG. 3
FIG. 2
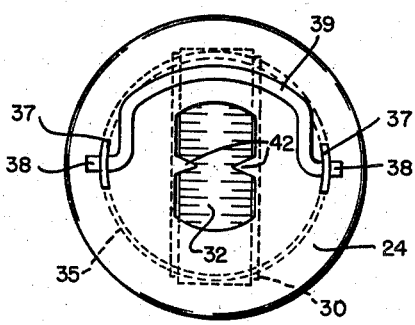
FIG. 4
Inventor
JOSEPH M. OLSON
By Herbert E. Smith
Attorney July 2, 1940.   J. M. OLSON   2,206,329
TANK GAUGE
Filed Nov. 8, 1939   2 Sheets-Sheet 2
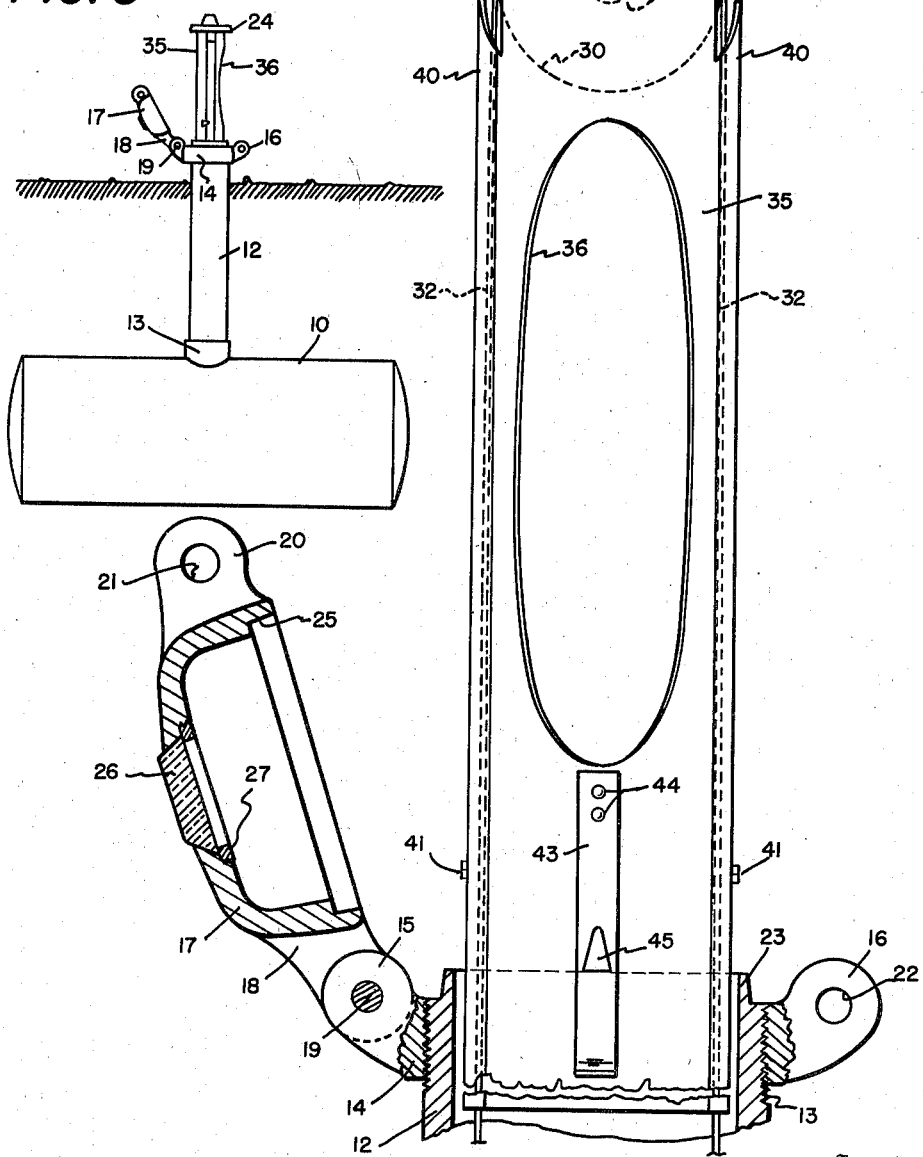
Inventor
JOSEPH M. OLSON
By Herbert E. Smith
Attorney Patented July 2, 1940

2,206,329

UNITED STATES PATENT OFFICE 2,206,329

TANK GAUGE

Joseph M. Olson, Coeur d'Alene, Idaho

Application November 8, 1939, Serial No. 303,417

9 Claims. (Cl. 73—321)

This invention relates to improvements in a tank gauge of the type employed for indicating the liquid level in such containers for the purposes of measuring the quantity of fluid.

My invention is adaptable for many and various uses and for the purposes of this description I have shown and will describe the device as though it were installed in a buried tank, as for instance, at a gas station. I do not wish to be limited by this showing for the reason that, broadly, my invention relates to the gauge mechanism and its carriage or mount.

It is well-known that gasoline storage tanks at service stations are seldom emptied of all their contents, the custom being to always leave a quantity of fluid in the bottom of the tank. This remainder has a variable level and ranges in depth from one or two inches up to substantially a full tank. It is customary in measuring the depth of the fluid remaining in the tank to use measuring sticks which must be kept at some point remote from the tank and always necessitates opening the tank in order to get a measurement. I propose to provide an accurate reading of a tank contents at all times without the necessity of outside devices and regardless of the tank being closed or open for filling and during filling.

It is an important object of my invention to provide a roller supported gauge tape having a float on one end which may be raised and lowered as the volume of the liquid in the container varies, and a weight at the other end of the tape to keep the gauge tape taut over the roller.

It is a further object of my invention to provide a movable carriage for the gauge tape, its roller, and the necessary supports, which can be so exposed that the filling hose may readily and easily be used to fill the tank.

Another object of my invention is to provide locking means for enclosing the gauge mechanism of my invention, which at the same time permits a reading to be taken without unlocking the device.

A still further object of the invention is to provide a device of the nature described which may be readily installed in all types of commercial tanks with simplicity and without material alteration of the conventional structures now used.

In the drawings wherein I have disclosed a preferred embodiment of my invention, like numerals are used to designate like parts throughout the same.

Figure 1 is somewhat of a diagrammatic view showing my device installed in connection with a conventional tank and its filler pipe, Figure 2 is a vertical longitudinal sectional view taken through a filler pipe, taken on lines 2—2 of Figure 1, showing the parts of my gauge mechanism, Figure 3 is a horizontal sectional view taken on lines 3—3 of Figure 2, Figure 4 is a plan view of the top of the gauge mechanism, Figure 5 is a diagrammatic view similar to that of Figure 1, but with a gauge mechanism and its carriage raised to the filling position from a filler pipe, and Figure 6 is a longitudinal view taken on a plane at right angles to the showing of Figure 2, and in which the cap and its support are shown in cross-section.

The numeral 10 designates a tank having a quantity of a liquid 11 therein and extending from its upper edge is a filler pipe 12. The pipe 12 is threaded at 13, and an encircling collar 14 is secured thereon.

On the opposite sides of the collar 14 I provide outstanding ears 15 and 16. The pipe cap 17, having spaced ears 18, is pivotally supported on the ear 15 by means of the pivot pin 19. The ear 20 on the opposite side of the cap 17 has a central opening 21 which registers with the opening 22 of the ear 16 for the reception of a padlock.

An annular tapered flange 23 is formed on the upper end of the pipe 12 and a gauge supporting plate 24 engages this flange closely, and by resting thereon supports the gauge mechanism to be described. The cap 17 has an annular tapered groove 25 which fits over the plate 24 when the cap is in locked position, as shown in Figure 2, to form a moisture tight connection.

The numeral 26 designates an observation window that is fitted into an opening in the upper face of the cap 17 and is retained in position by means of the bezel ring 27.

On the inner or under face of the flanged plate 24 I provide depending ears 28 and 29, which form pivotal supports for the roller 30 and its axle 31.

A gauge tape 32 lays over the upper half of the roller 30 and on one of the ends a float 33 is secured. A weight 34 on the other end of the gauge serves to keep the tape taut over the roller 30. A tube 35, having an elongated filler opening 36, is secured to the plate 24 and depends therefrom, and ears 37 on the upper end of the tube pass through suitable openings in the base plate for the reception of the outwardly turned ends 38 of a bale 39. The diameter of the roller 30 is slightly greater than that of the tube 35, and the tape as it leaves the roller passes downwardly outside of the tube. By means of a pair of flanged guides 40 secured in spaced relation to each other along each of opposite sides of the tube, the tape is guided and is kept away from the inner wall of the pipe 12 to eliminate wear or harm to the tape and its indicating markings.

A pointer 41 is shown in Figure 2 to be located near the lower end of the tube 35, and pointers 42 on the upper face of the plate 24 also serve to indicate the reading point on the tape.

Spring blades 43—43 are secured on opposite sides of the tube near its lower end by means of the rivets 44, and the blades 43 have outstanding spurs 45, operable for a purpose to be later described.

The tape 32 is of the nature of the currently popular measuring and gauge tapes, which in the normal condition are arcuate in cross-section, as shown in Figure 3. It will be apparent that by the use of this tape, the graduations on its reading face will be protected from abrasion against the surfaces near which it must pass as it is raised or lowered in the guide flanges 40 of the tube 35.

When the gauge mechanism in the pipe 12 is in the normally closed or locked position of Figure 2, reading on the tape can be taken through the window 26. When it is desired to replenish the fluid in the tank 10, the cap 17 may be swung out of its closed position to the position of Figure 6 and by grasping the bale 39, the gauge roller and the tube 35 may be raised or withdrawn from the pipe 12 and it is customary to lift the device only so far as is necessary to permit the spurs 45 on the springs 43 to flex outwardly and engage the upper top face of the flange 23. In this manner the tube 35 is supported exterior of and above the pipe 12, but with the gauge tape and its float and weight in the proper operable position within the tank.

It should be understood that the weight which serves to keep the tape tight has been raised somewhat with relation to the float and that the point on the tape, which in the position shown in Figure 2 is under the pointers 42, will now be located down on the side of the tube 35 and under the pointer 41.

The usual filler nozzle may be inserted into the opening 36 and gas or other liquid placed into the tank in the usual manner. As the liquid flows in and the float 33 rises farther above the bottom of the tank, the tape also will rise, rolling over the roller 30 until the tube 35 is returned to the position in Figure 2. Readings will still be taken at the pointer 41. When the tank has been filled as much as is desired, the operator may grasp the springs 43, causing them to lie more flatly against the side of the tube 35 and thus disengaging the spurs 45 from the upper end of the tank, and he may lower the tube and gauge mechanism into the pipe 12, of course closing and locking the cap as before.

Operation

The present-day type of automobile gas service station would be a good example where the device of the present invention could be found extremely useful.

Such stations usually supply the public with three or more brands of gasoline. Ordinance requirements necessitate the burying of the service tanks with the filler pipes extending to some point immediately above the ground for the purpose of supplying the tanks with liquid fuel when needed. At the present time only an approximate determination of the number of gallons of liquid contained in a tank can be had.

This is accomplished through a gauge stick that has to be inserted through the filler pipe and down into the tank. Many stations, however, operate on a twenty-four hour a day basis. This requires three shifts of station attendants and, in order to account for the amount of gallonage dispensed by each shift, an accurate reading of the contents of the tanks is necessary. It is time-consuming to follow the present-day method of roughly estimating the gallonage, and it is further necessary to secure an accurate reading so that as one shift leaves for the day, the one coming on can also make a ready reading through the window in the present device and determine accurately how many gallons they had on hand when when the shift came in charge, insuring that proper records can be kept, and in the case of shortage, that a close check can be had upon the operation of the business.

When a tank is to be filled, it is proper to take a reading of the contents, then unlock and throw the cap and raise the filler tube until it rests upon the spurs 45. The tape will have moved so that the accurate reading can now be determined upon the side of the tube at the pointer 41. The servicing tank wagon can then deposit in the tank whatever amount may be ordered, or to fill the tank without the possibility of overflowing so long as the gauge is watched.

Since the tube 35 is somewhat smaller than the inside diameter of the pipe 12, ample space is provided to allow the escape of air in the filling tank to insure that there will not be an interruption of the full volume of flow from the tank through the filling hose and nozzle. When this operation of filling is complete, the gauge structure may be lowered into the pipe 12, the cap refitted and locked, therefrom reading at all stages may be made through the window in the cap.

I have adopted the use of an arcuate tape as heretofore described, which I have found flattens when it passes over the roller 30 and does not interrupt the free action of the float and of the tape and of the weight attached to the opposite end of the tape. The arcuate surface, however insures that only the back side of the tape and the outer front edges thereof will have frictional engagement with any part of the device that otherwise would tend to wear the markings and gauge numbers from the tape. Through the use of the guide channel along the sides of the tube, the tape is insured of proper position and freedom of action for the purpose herein set forth.

Having thus fully described my invention, what I claim as new and desire to secure by Letters Patent is:

1. In a tank gauge, the combination with a graduated tape having an operating float and a counter-weight therefor, of a supporting plate adapted to rest upon the upper edge of the filler opening of the tank, a roller journaled on said plate adapted to carry the graduated tape, a tube depending from said plate and having a side filler opening and a pair of longitudinal guide ways on either side of the opening to receive and guide the graduated tape, said tube being movable outwardly of the tank filler opening, and supporting means adjacent the lower end of the tube cooperable with the upper face of the tank filler opening when the tube is in the extended position.

2. In a tank gauge, the combination with a graduated tape having an operating float and a counter-weight therefor, of a supporting plate adapted to rest upon the upper edge of the filler opening of the tank, journal supports depending from said plate, a roller journaled in said supports adapted to carry the graduated tape with a portion thereof extending above the upper face of the supporting plate, a tube depending from said plate and having a side filler opening and a pair of longitudinal guide ways on either side of the opening to receive and guide the graduated tape, said tube being movable outwardly of the tank filler opening, and supporting means adjacent the lower end of the tube cooperable with the upper face of the tank filler opening when the tube is in the extended position.

3. In a tank gauge, the combination with a graduated tape having an operating float and a counter-weight therefor, of a supporting plate having a pair of slots and adapted to rest upon the upper edge of the filler opening of the tank, a roller journaled on said plate adapted to carry the graduated tape, a tube depending from said plate and having a side filler opening and a pair of longitudinal guide ways on either side of the opening to receive and guide the graduated tape, said tube being movable outwardly of the tank filler opening, ears on the upper end of said tube passing through the slots in the supporting plate, a bale secured for pivotal movement in said ears, and supporting means adjacent the lower end of the tube cooperable with the upper face of the tank filler opening when the tube is in the extended position.

4. In a tank gauge, the combination with a graduated tape having an operating float and a counter-weight therefor, of a supporting plate adapted to rest upon the upper edge of a filler opening of the tank, a roller journaled on said plate adapted to carry the graduated tape, a tube depending from said plate and having a side filler opening and a pair of longitudinal guide ways on either side of the opening to receive and guide the graduated tape, said tube being movable outwardly of the tank filler opening, and spring fingers having outstanding spurs adjacent the lower end of the tube cooperable with the upper face of the tank filler opening when the tube is in the extended position.

5. In a tank gauge, the combination with a graduated tape having an operating float and a counter-weight therefor, of a supporting plate having a transverse opening, a roller journaled on said plate and passing through the transverse opening and carrying the graduated tape, pointers on said plate adjacent the path of the graduated tape, a tube depending from said plate and having a side filler opening and a pair of longitudinal guide ways on either side of the opening to receive and guide the graduated tape, said tube being movable outwardly of the tank filler opening, and supporting means adjacent the lower end of the tube cooperable with the upper face of the tank filler opening when the tube is in the extended position.

6. In a tank gauge, the combination with a graduated tape having an operating float and a counter-weight therefor, of a supporting plate adapted to rest upon the upper edge of the filler opening of the tank, a roller journaled on said plate adapted to carry the graduated tape, a tube depending from said plate and having a side filler opening and two pairs of opposed guide flanges secured longitudinally of said tube on either side of the opening to receive and guide the graduated tape, said tube being movable outwardly of the tank filler opening, and supporting means adjacent the lower end of the tube cooperable with the upper face of the tank filler opening when the tube is in the extended position.

7. In a tank gauge, the combination with a graduated tape having an operating float and a counter-weight therefor, of a supporting plate adapted to rest upon the upper edge of the filler opening of the tank, a roller journaled on said plate adapted to carry the graduated tape, a tube depending from said plate and having a side filler opening and a pair of longitudinal guide ways on either side of the opening to receive and guide the graduated tape, said tube being movable outwardly of the tank filler opening, supporting means adjacent the lower end of the tube cooperable with the upper face of the tank filler opening when the tube is in the extended position, and closure means associated with said tank adapted to enclose and secure the supporting plate in its unextended position upon the upper edge of the tank filler opening.

8. In a tank gauge, the combination with a graduated tape having an arcuate cross-section and having an operating float and a counter-weight therefor, of a supporting plate adapted to rest upon the upper edge of the filler opening of the tank, a roller journaled on said plate adapted to carry the graduated tape, a tube depending from said plate and having a side filler opening and a pair of longitudinal guide ways on either side of the opening to receive and guide the graduated tape, said tube being movable outwardly of the tank filler opening, and supporting means adjacent the lower end of the tube cooperable with the upper face of the tank filler opening when the tube is in the extended position.

9. In a tank gauge, the combination with a graduated tape having an operating float and a counter-weight therefor, of a supporting plate adapted to rest upon the upper edge of the filler opening of the tank, a roller journaled on said plate adapted to carry the graduated tape, a tube depending from said plate and having a side filler opening and a pair of longitudinal guide ways on either side of the opening to receive and guide the graduated tape, said tube being movable outwardly of the tank filler opening, pointed means on the guide ways, and supporting means adjacent the lower end of the tube cooperable with the upper face of the tank filler opening when the tube is in the extended position.

JOSEPH M. OLSON.